(12) United States Patent
Chandrasekhar et al.

(10) Patent No.: US 6,558,759 B2
(45) Date of Patent: May 6, 2003

(54) LIQUID CRYSTAL DISPLAY DEVICE

(75) Inventors: Sivaramakrishna Chandrasekhar, Bangalore (IN); Subbarao Krishna Prasad, Bangalore (IN); Geetha Gopinathan Nair, Bangalore (IN); Doddamane Sreenivasamurthy Shankar Rao, Bangalore (IN); Sandeep Kumar, Bangalore (IN); Mayandithevar Manickam, Bangalore (IN)

(73) Assignee: Centre for Liquid Crystal Research (ID)

( * ) Notice: Subject to any disclaimer, the term of this patent is extended or adjusted under 35 U.S.C. 154(b) by 149 days.

(21) Appl. No.: 09/754,750

(22) Filed: Jan. 4, 2001

(65) Prior Publication Data

US 2001/0046568 A1 Nov. 29, 2001

Related U.S. Application Data

(63) Continuation-in-part of application No. 09/159,743, filed on Sep. 24, 1998, now abandoned.

(30) Foreign Application Priority Data

May 27, 1998 (IN) ................................................ 1131/98

(51) Int. Cl.[7] ........................ C09K 19/04; C09K 19/60; C09K 19/32; G02F 1/1333
(52) U.S. Cl. ........................ 428/1.3; 428/1.31; 428/1.4; 428/1.6; 252/299.1; 252/299.62; 349/67; 349/178; 349/186
(58) Field of Search .................... 252/299.01, 299.1; 428/1.1, 1.3, 1.4, 1.6, 1.31; 349/178, 186, 67

(56) References Cited

U.S. PATENT DOCUMENTS

| | | | | |
|---|---|---|---|---|
| 4,877,220 A | * | 10/1989 | Praefcke et al. | 252/299.61 |
| 5,730,900 A | | 3/1998 | Kawata | 252/299 |
| 5,736,068 A | | 4/1998 | Haussling | 252/299 |
| 5,828,432 A | | 10/1998 | Shashidhar | 349/139 |
| 5,883,685 A | | 3/1999 | Mazaki | 349/117 |
| 6,259,562 B1 | * | 12/2000 | Kanbe et al. | 428/1.1 |
| 6,245,398 B1 | * | 6/2001 | Matsuoka et al. | 428/1.3 |
| 6,344,153 B1 | * | 2/2002 | Katz et al. | 252/299.62 |

OTHER PUBLICATIONS

S. Chandrasekhar, et al; Liquid Crystals of Disc–like Molecules; Nov. 5, 1977; Pramana, vol. 9, No. 5; pp. 471–480.

Y. Toko, et al.; Amorphous Twisted Nematic–liquid–crystal displays fabricated by nonrubbing showing wide and uniform viewing–angle characteristics accompanying excellent voltage holding ratios; J. Appl. Phys. 74 (3), Aug. 1, 1993; pp. 2071–2075.

(List continued on next page.)

Primary Examiner—Shean C. Wu
(74) Attorney, Agent, or Firm—Norris, McLaughlin & Marcus P.A.

(57) ABSTRACT

A liquid crystal display device is formed with a pair of transparent substrates, each substrate having on one of its surfaces a coating of a transparent electrically conducting material which serves as an electrode. A nematic discotic material is sandwiched between the coated surfaces of the substrates thereby forming a cell. The nematic discotic material has a negative dielectric anisotropy and acts as the electrically switchable material for the electro-optic functioning of the liquid crystal display device. In addition, the cell resides between a pair of crossed polarizers.

18 Claims, 8 Drawing Sheets

Pixel OFF

Light

Pixel ON

Light

OTHER PUBLICATIONS

G. Baur, et al; In–plane Switching: A novel Electro–optic Effect; Institut Angewandte Festkorperphysik, Freiburg, Germany; Liquid Crystals Today vol. 5, 3 (1995).

M. Oh–e, et al.; Switching of Negative and Positive Dielectro–anisotropic Liquid Crystals by In–plane Electric Fields; J. Appl. Phys. 82(2), Jul. 15, 1997; pp. 528–534.

S. Lee, et al.; Rubbing–free, Vertically aligned Nematic Liquid Crystal Display Controlled by In–plane Field; Appl. Phys. Lett. 71 (19) Nov. 10, 1997; pp. 2851–2853.

H. Mori; Novel Optical Compensators of Negative Birefringence for Wide–viewing–angle Twisted–neumatic Liquid–crystal Displays; Jpn.J.Appl. Phys. vol. 36 (1997) Part 1, No. 3A Mar. 1997; pp. 1068–1072.

H. Mori; Performance of a Novel Optical Compensation Film based on Negative Birefringence of Discotic Compound for Wide–Viewing–Angle Twisted–Nematic Liquid–Crystal Displays; Jpn. J. Appl. Phys. vol. 36 (1997) Part 1. No. 1A Jan. 1997; pp. 143–147.

K. Yang; Two–domain 80°–Twisted Nematic Liquid Crystal Display for Grayscale Applications; Jpn. J. Appl. Phys. vol. 31 (1992) Part 2, No. 11B, Nov. 15, 1992; pp. L 1603–L 1605.

J. Chen; 41.1: Four–domain TN–LCD Fabricated by Reverse Rubbing or Double Evaporation; Sid 95 Digest; pp. 865–868.

Y. Toko; P–49: TN–LCDs Fabricated by Non–rubbing Showing Wide and Homogeneous Viewing Angular Characteristics and Excellent Voltage Holding Ratio; SID 93 Digest; pp. 622–625.

B. Kohne; et al.; Hexaalkinylbenzol–Derivate, erste Kohlenwasserstoffe als neuartige columnar–oder nematisch–discotische Flüssigkristalle; CHIMIA 41 (1987) Nr. 6 (Jun.); pp. 196–198.

G. Heppke; et al.; Bend and Splay Elastic Constants of Some Discotic Nematic Compounds; Mol. Cryst. Liq. Cryst. Letters vol. 8(1) 1991; pp. 17–25.

K. Praefcke, et al.; News on Nematic–Biaxial Liquid Crystals; Mol. Cryst. Liq. Cryst. 1991, vol. 198; pp. 393–405.

T. Phillips, et al.; On the Influence of Short Range Order Upon the Physical Properties of Triphenylene Nematic Discogens; Liquid Crystals, 1993, vol. 15, No. 2; pp. 203–215.

* cited by examiner

LIQUID CRYSTAL DISPLAY DEVICE

This application is a continuation-in-part application of U.S. Ser. No. 09/159,743 filed Sep. 24, 1998, now abandoned.

BACKGROUND OF THE INVENTION

1. Field of the Invention

This invention relates to an improved Liquid Crystal Display (LCD) device which is used in products ranging from watch displays to flat panel colour TV screens The Liquid Crystal Device industry is currently a multi-billion dollar industry. In this industry, the products range from simple watch displays to flat panel colour TV screens. The device described in the present invention has advantages over the conventional LCD devices in that it has a wide and symmetrical viewing angle, no reversal of the contrast ratio in any direction, and also results in a simplification of the fabrication process. Accordingly, the device of the present invention will be very useful for various applications in liquid crystal industry.

When molecular crystals are heated to their melting point they usually change into the liquid phase. The periodic structure of the lattice as well as the orientational ordering of the molecules are destroyed simultaneously. However if the constituent molecules have a pronounced anisotropy of shape, such as a rod or a disc, the melting of the lattice may precede the disappearance of the orientational ordering. One, then, has an intermediate phase composed of molecules which are more or less parallel to each other, but at the same time exhibiting a certain degree of fluidity. The molecules can slide over on one another while still preserving their parallelism. The fluid is therefore anisotropic, turbid and, like a crystal, shows optical birefringence and dielectric anisotropy. At a higher temperature there is orientational melting and the anisotropic fluid transforms into the ordinary isotropic clear liquid. Such intermediate phases, which occur as a result of heating or cooling, are referred to as thermotropic liquid crystals.

Thermotropic liquid crystals can be classified broadly into two types, (i) those composed of rod-shaped molecules (called "calamitic" liquid crystals) which are known from the end of 19th century and form the majority of the currently known liquid crystals and (ii) those composed of disc-shaped molecules (called "discotic" liquid crystals) which have been developed recently.

2. Description of the Related Art

Figure 1:
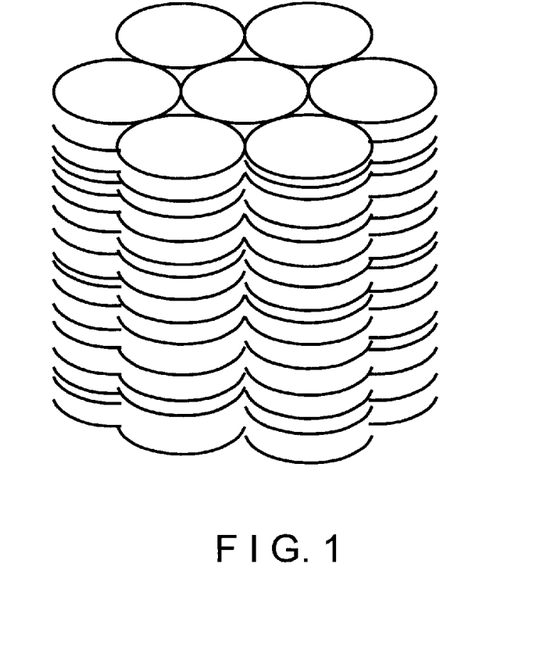
FIG. 1 shows a perspective schematic view of a basic columnar structure of discotic liquid crystal.
Figure 2:
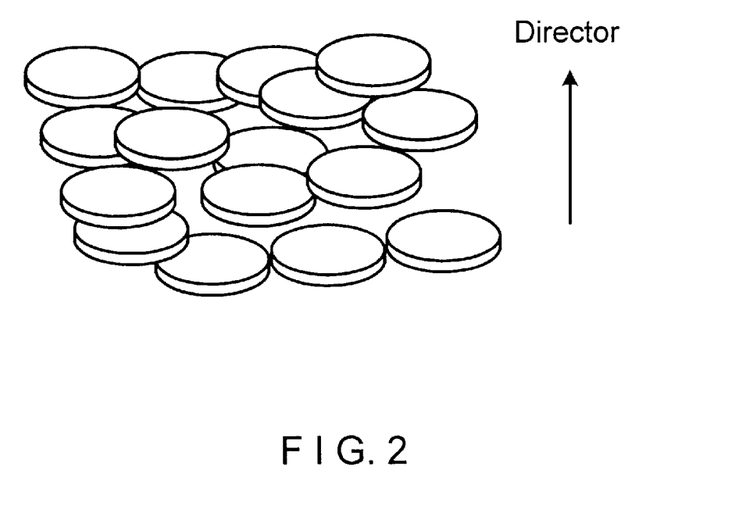
FIG. 2 shows a perspective view of a nematic ($N_D$) phase.

Discotic liquid crystals which were discovered by us as recently as 1977 represent a new class of thermotropic liquid crystal. In this context reference may be made to the publication of S. Chandrasekhar, B. K. Sadashiva and K. A. Suresh, *Pramana*, 9, 471–480 (1977). In this case the discs are stacked one on top of the other to form columns, the different columns constituting a two-dimensional lattice. The basic columnar structure is shown in FIG. 1 of the drawing accompanying this specification. A number of modifications of the above said basic structure have been identified. Some discotic compounds exhibit a nematic ($N_D$) phase as well. It is a fluid phase consisting of an orientationally ordered arrangement of discs, but with no long range translational order, somewhat like a pile of coins as shown in FIG. 2. However, unlike the usual nematic calamitic, the nematic discotic is optically negative. The preferred orientation of the axis of the disc is termed as the director as shown in FIG. 2.

The advent of discotic liquid crystals triggered off a spate of activity in this field and well over a thousand discotic compounds have been reported to date. A few discotic compounds are exemplified below: Hexaalkonoyloxy benzenes, hexaalkoxy triphenylenes, bis-(4-n-decylbenzoyl) methanato copper (II), hexa-n-alkanoates of truxene and octasubstituted phthalocyanines.

The potential uses of such materials are as quasi-one-dimensional conductors, photoconducting systems, ferroelectrics, light emitting diodes, photovoltaic solar cells, optical data storage devices and hybrid computer chips for molecular electronics.

Display devices based on calamitic liquid crystals are well known. A widely used device is the twisted nematic (TN) display device. In a twisted nematic display device two transparent glass plates are coated on their inner surfaces with a thin layer of transparent electrically conducting material, such as indium tin oxide, and further with a thin layer of a polyimide. The method of unidirectionally rubbing the said substrates with cotton or rayon or nylon fabric is widely used to achieve a macroscopic orientation of the liquid crystal director. The two glass plates are held apart at a distance of approximately 6–10 $\mu$m by means of spacers to form a cell, with the rubbing directions of the polyimide layers orthogonal to each other. The gap between the substrates of the cell is filled with a calamitic nematic liquid crystal. Owing to the boundary conditions the nematic liquid crystal will become oriented parallel to the rubbing direction of each glass plate and consequently the director will undergo a twist of 90° over the nematic layer distance. Polarizer sheets are attached to the outer surfaces of the glass plates with the axis of vibration (polarizing axis) of each sheet parallel to the rubbing direction of the plate to which it is attached. Unpolarized light is transformed into linearly polarized light by the polarizer fixed on the entrance side of the cell and emerges on the exit side with the polarization axis rotated through 90°. The emergent light will be transmitted by the second polarizer. Thus in this configuration, the so called normally white mode, the display appears bright in the unactivated state. A white mode with enhanced viewing angle can be achieved by setting the polarizers with their polarizing axes perpendicular to the rubbing directions. The application of an electric field normal to the layer orients the liquid crystal molecules (of positive dielectric anisotropy, $\Delta\epsilon>0$) with their long axes along the layer normal. In this activated state the polarization axis of light is not rotated by the liquid crystalline medium and the display appears black. Orientation of one polarizer parallel and the second polarizer perpendicular to the rubbing direction results in a black appearance in the unactivated state and a bright appearance in the activated state. This so called black mode is useful for automobile dash board applications.

Figure 3:
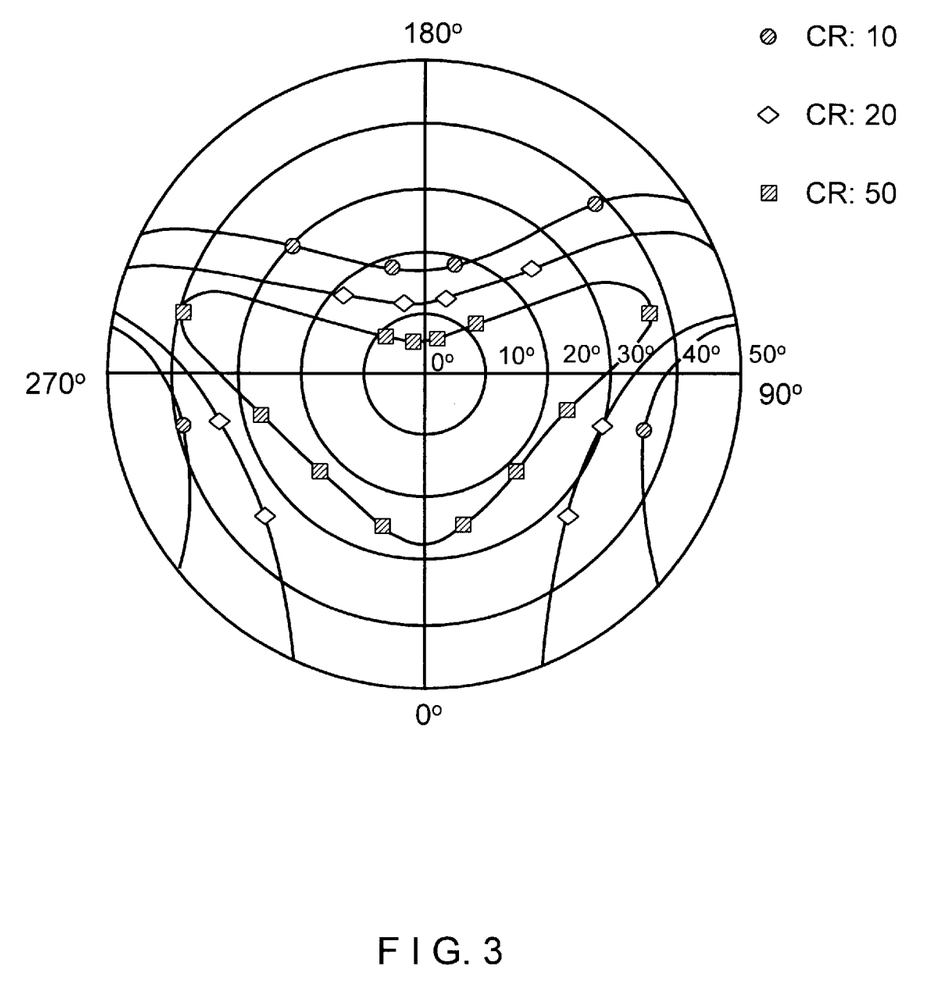
FIG. 3 shows a typical polar plot of the contrast ratio (CR) for a convention TN device.

The major disadvantage of the above type of device is that when it is viewed obliquely, the viewing angle characteristic is poor, resulting in a loss of contrast, and even contrast inversion at certain azimuthal angles. See FIG. 3, which is taken from the publication of Y. Toko, T. Sugiyama, K. Katoh, Y. Imura and S. Kobayashi, *J. Appl. Phys.*, 74, 2071–75 (1993) showing a typical polar plot of the contrast ratio (CR) for a conventional TN device.

Another widely used device is the supertwisted nematic (STN) device. The construction of such a device is similar to that of a TN device explained above except that the twist angle of the director is between 180° and 270°, instead of 90°. The higher twist angle is achieved by incorporating a suitable quantity of a chiral compound as a dopant in the nematic material before it is filled into the cell. However this device does not lead to any improvement in the viewing angle characteristic.

Both the TN and STN devices suffer from the additional disadvantage that for multiplexed displays there is a large difference in the pixel capacitance between the ON and OFF states, which gives rise to the problem of cross talk between pixels.

The viewing angle profiles, the symmetry and the angle dependence of the intensity contrast ratio between the ON and OFF states of any display device are important criteria for determining the quality of performance of the device. Several attempts have been made to enhance the performance of such devices. These attempts are directed mainly to improve the viewing angle characteristics using different techniques such as dividing each pixel into sub-pixels, adding retardation films, or by applying an electric field parallel to the substrate plane. The noteworthy point in all these attempts is the fact that the liquid crystalline material used is of the nematic calamitic type. No attempts have been made to date employing nematic discotic material for fabricating a display device, or to using same as the electrically switchable material.

For example, regarding the modification based on applying an electric field parallel to the plane of the substrates reference may be made to the publications of G. Baur, R. Kiefer, H. Klausmann and F. Windscheid, *Liquid Crystal Today*, 5, 13–14 (1995); M. Oh-e, M. Yoneya and K. Kondo, *J. Appl. Phys.*, 82, 528–535 (1997); S. H. Lee, H. Y. Kim, I. C. Park, B. G. Rho, J. S. Park, H. S. Park and C. H. Lee, *Appl. Phys. Lett.*, 71, 2851–2853, (1997). In this method the authors have improved the viewing angle characteristics of liquid crystal devices by employing in-plane electrodes on only one of the substrates and by avoiding the assymmetry of the director profile.

In the publications of H. Mori, *Jpn. J. Appl. Phys.*, 36, 1068–1072 (1997); H, Mori, Yoji Itoh, Yosuke Nishiura, Taku Nakamura, Yukio Shinagawa, *Jpn. J. Appl. Phys.*, 36, 143–147 (1997) an optical compensator with negative birefringence was introduced to reduce the amount of light leakage in the dark state.

In the publications of K. H. Yang, *Jpn. J. Appl. Phys.*, 31, L1603–1605 (1992) and J. Chen, P. J. Bos, D. R. Bryant, D. L. Johnson, S. H. Jamal, J. R. Kelly, SID 95 Digest, 865–868 (1995) the authors have employed multiple domains of the liquid crystals in which the orientation of the director was different in each of the domains (pixels).

The devices fabricated as mentioned above do not improve the viewing angle characteristics of the device satisfactorily. Further they also involve additional steps in the fabrication process.

In the publications of Y. Toko, T. Sugiyama, K. Katoh, Y. Iimura and S. Kobayashi, SID 93 Digest, 622–625 (1993); *J. Appl. Phys.*, 74, 2071–75 (1993) a simpler process for producing LCD having improved viewing angle characteristics has been disclosed. In this process polymer films are coated on the transparent conducting substrates, but no rubbing is done. The non-rubbed polymer film is optically and structurally isotropic and the director is parallel to the surfaces of the substrates but randomly oriented in the plane of the substrate in the OFF state. In the ON state the director is normal to the surfaces of the substrates. This so called amorphous TN device gives an improved viewing angle characteristic, free from contrast inversion. See FIG. 4, which is taken from the publication of Toko et. al. referred to above. It is to be noted that the liquid crystal material used in this device is again of the nematic calamitic type and not of the nematic discotic type.

Other prior art devices are embodied in U.S. Pat. No. 5,833,685 to Mazaki et al., and U.S. Pat. No. 5,730,900 to Kawata et al. Kawata uses a discotic compound for encapsulating and orienting the LC molecules of the switchable material. The discotic material does not play a part in the electrical switching process. Mazaki teaches an optical compensating film of fixed orientation made of discotic material located between the liquid crystal cell and the polarizing plates. This discotic film serves as an optical compensator and increases the viewing angle relative to the viewing angle of the uncompensated display. However, the compensating film made of discotic material of negative optical anisotropy plays no part in the switching process. Accordingly, neither of these references contemplate the advantages to be achieved by the novel structure discussed below.

Recognising the importance of improving the viewing angle characteristics of liquid crystal devices we undertook intensive research work in this direction. Our sustained research work resulted in our finding that if nematic discotic materials are employed in liquid crystal devices as the electrically switchable material, the viewing angle characteristics of such devices can be further enhanced.

SUMMARY OF THE INVENTION

Therefore the main object of the present invention is to provide a liquid crystal device having improved viewing angle characteristics employing nematic discotic material.

Another object of this invention is to provide a liquid crystal device having no reversal of the contrast ratio in any direction.

Yet another object of the present invention is to provide a liquid crystal device with reduced difference in the pixel capacitance between the ON and the OFF states resulting in lowering of the cross talks substantially in the case of a multiplexed display device.

Still another object of the present invention is to provide a liquid crystal device employing a simple fabrication process.

To meet above objects, the invention, for the first time, provides a liquid crystal device comprising nematic discotic material as the electrically switchable material.

DESCRIPTION OF THE PREFERRED EMBODIMENTS

The present invention differs from any of the previously disclosed LCDs in that it employs a nematic discotic material and does not use a calamitic material. To date a nematic discotic material has never been used for the fabrication of a liquid crystal display device. The material used is of negative dielectric anisotropy (Δε<0).

Accordingly, the present invention provides a Liquid Crystal Display Device comprising a) a pair of transparent substrates 3,6, b) each substrate having on one of its surfaces a coating of a transparent electrically conducting material which serves as an electrode, c) a nematic discotic material sandwiched between the coated surfaces of the said substrates thereby forming a cell 4, and d) the cell being placed between a pair of crossed polarizers 1,7, each having a respective axis of polarization 2,8.

The substrates employed in the device may be made of glass, plastic or other transparent material. Indium Tin Oxide or Tin Oxide may be employed as the electrically conducting material for coating the substrates. The resulting substrates may be preferably coated with an additional layer of polymer so as to make the contact between the nematic discotic material and the substrate uniform. The polymer when employed may be polyimides, polyamides, polyvinyl alcohol or a similar class of polymers. The gap between the substrates in the cell is defined by means of spacers which may be selected from polyethyleneterephthalate films, polyimide films or glass microspheres. The use of polarizers can be avoided by incorporating a suitable quantity of known discotic pleochroic dye as a dopant in the nematic discotic material before filling the cell. For this purpose derivatives of anthraquinone, phthalocyanine, porphyrin or other similar dye may be employed.

Figure 6:
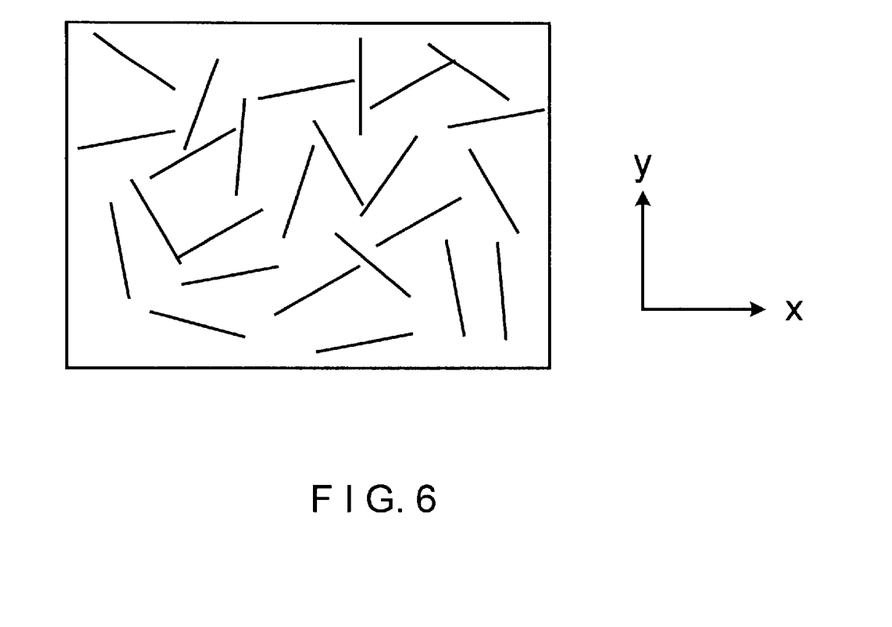
FIG. 6 is schematic view showing nematic discotic material realigned parallel to the surfaces of the substrates with random orientation of the director in the x-y plane.
Figure 7:
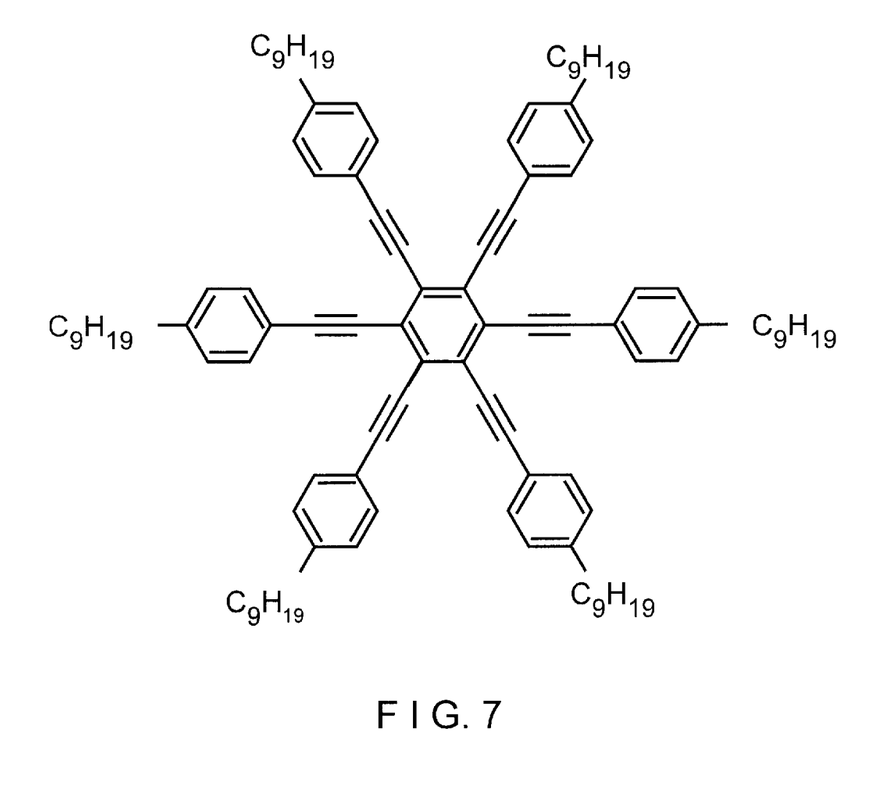
FIG. 7 shows the chemical formula for the compound hexakis ((4-nonylphenyl)ethynyl)benzene.
Figure 13:
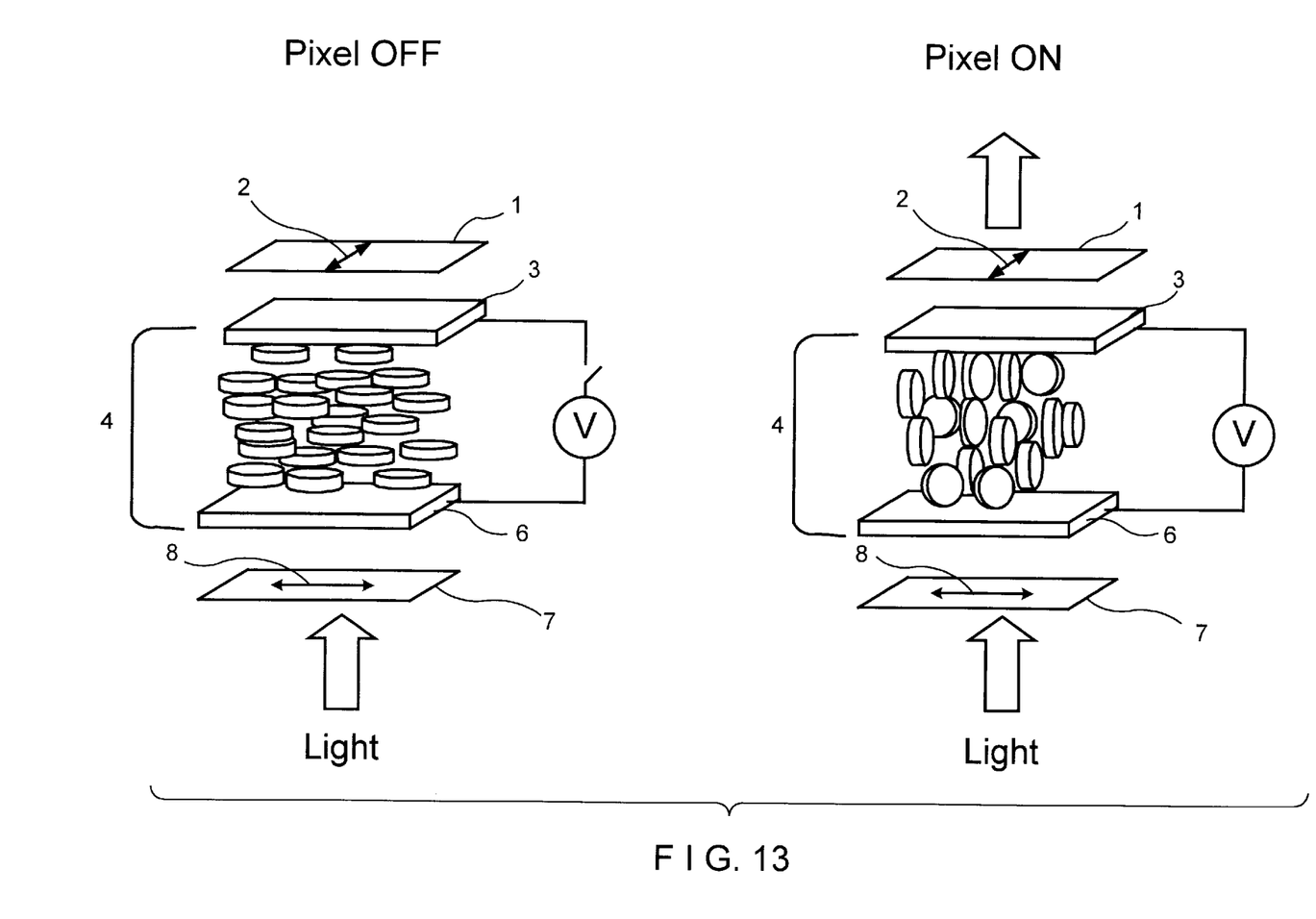
FIG. 13 is a comparative schematic drawing showing the cell and the alignment of the discotic material in the Pixel OFF and Pixel ON positions.

The nematic discotic material is sandwiched between the substrates. The disc-shaped molecules adhere flat against the coated surfaces of the substrates. As a result the nematic discotic material is uniformly oriented with the director perpendicular to the surface (i.e. along the z direction in FIG. 5). On application of an electric field along the z direction, the director in the material is realigned parallel to the surfaces of the substrates with random orientation of the director in the x-y plane (FIG. 6). In this manner, it is seen that the nematic discotic material acts as the electrically switchable material (FIG. 13). Accordingly, the discotic material itself is electrically switched to cause a reorientation of the director and achieves the electro-optic effect. Thus, between crossed polarizers there is a transition from a dark to a bright state when the field is switched ON (FIG. 7).

The device can also be used in the reflecting mode. For such an application an optical reflector may be incorporated at the bottom surface of the display device.

Figure 8:
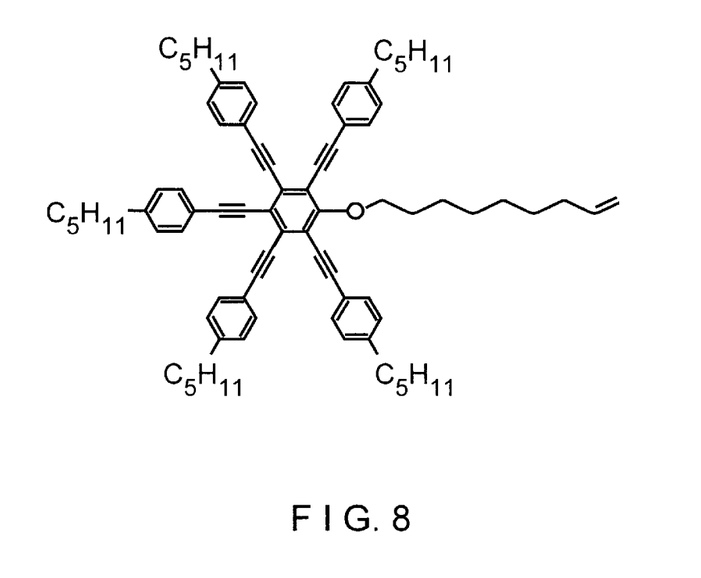
FIG. 8 shows the chemical formula for the compound undecenyl, pentakis[(4-pentylphenyl)ethynyl]phenyl ether.
Figure 9:
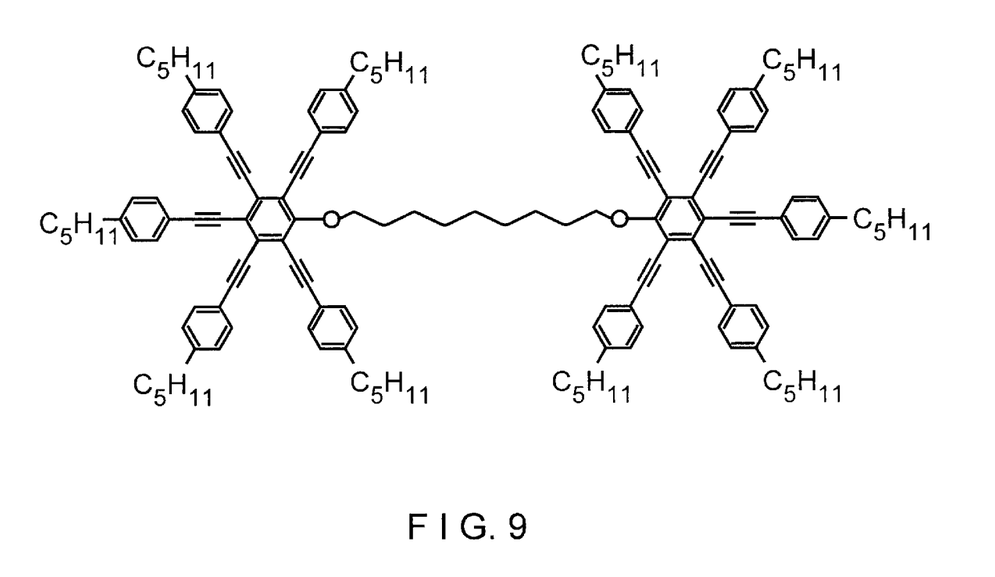
FIG. 9 shows the chemical formula for the compound α,ω-bis[penta(4-pentylphenylethynyl)phenoxy]phenoxy]alkane.
Figure 10:
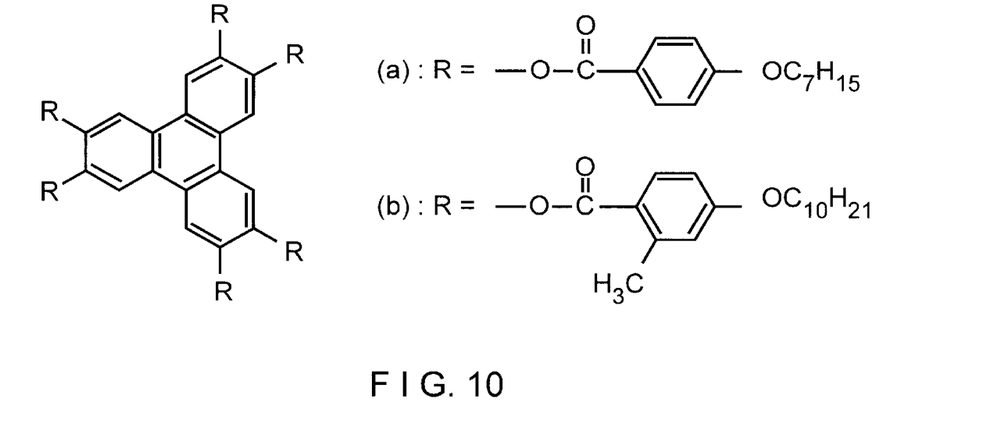
FIG. 10 shows the chemical formula for the compound of the derivatives of triphenylene.

The nematic discotic material employed in the device of the present invention may be selected from any substance having negative dielectric anisotropy such as hexakis ((4-nonylphenyl)ethynyl)benzene of the formula shown in FIG. 8, undecenyl pentakis[(4-pentylphenyl)ethynyl]phenyl ether of the formula shown in FIG. 9, α,ω-bis[penta(4-pentylphenylethynyl)phenoxy]alkane of the formula shown in FIG. 10, and derivatives of triphenylene of the formulas shown in FIGS. 11(a) and (b).

The compound of the formula shown in FIG. 8 exhibits the following sequence of transitions [B. Kohne and K. Praefcke, *Chimia,* 41, 196–198 (1987); G. Heppke, A. Ranft and B. Sabaschus, *Mol. Cryst. Liq. Cryst. Lett.,* 8, 17–25 (1991)]

The compound of the formula shown in FIG. 9 has the following sequence of transitions [K. Praefcke, B. Kohne, B. Gündogan, D. Singer, D. Demus, S. Diele, G. Pelzl and U. Bakowsky, *Mol. Cryst. Liq. Cryst.,* 198, 393–405 (1991)]

The compound of the formula shown in FIG. 10 has the following sequence of transitions [K. Praefcke, B. Kohne, B. Gündogan, D. Singer, D. Demus, S. Diele, G. Pelzl and U. Bakowsky, *Mol. Cryst. Liq. Cryst.,* 198, 393–405 (1991)]

Figure 11:
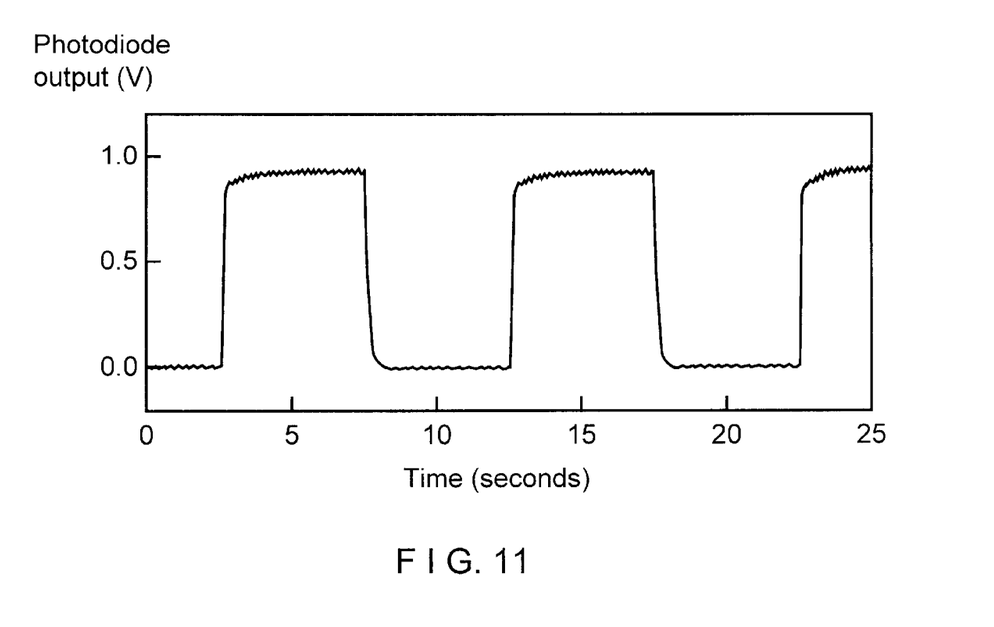
FIG. 11 shows a typical electro-optic response curve obtained when employing a liquid crystal display device using hexakis ((4-nonylphenyl)ethynyl)benzene (of negative dielectric anisotropy Δε=−0.18)

The compounds of the formulas shown in FIG. 11 have the following sequence of transitions [T. J. Phillips, J. C. Jones and D. G. McDonnell, *Liquid Crystals,* 15, 203–215 (1993)]

Figures 4, 5:
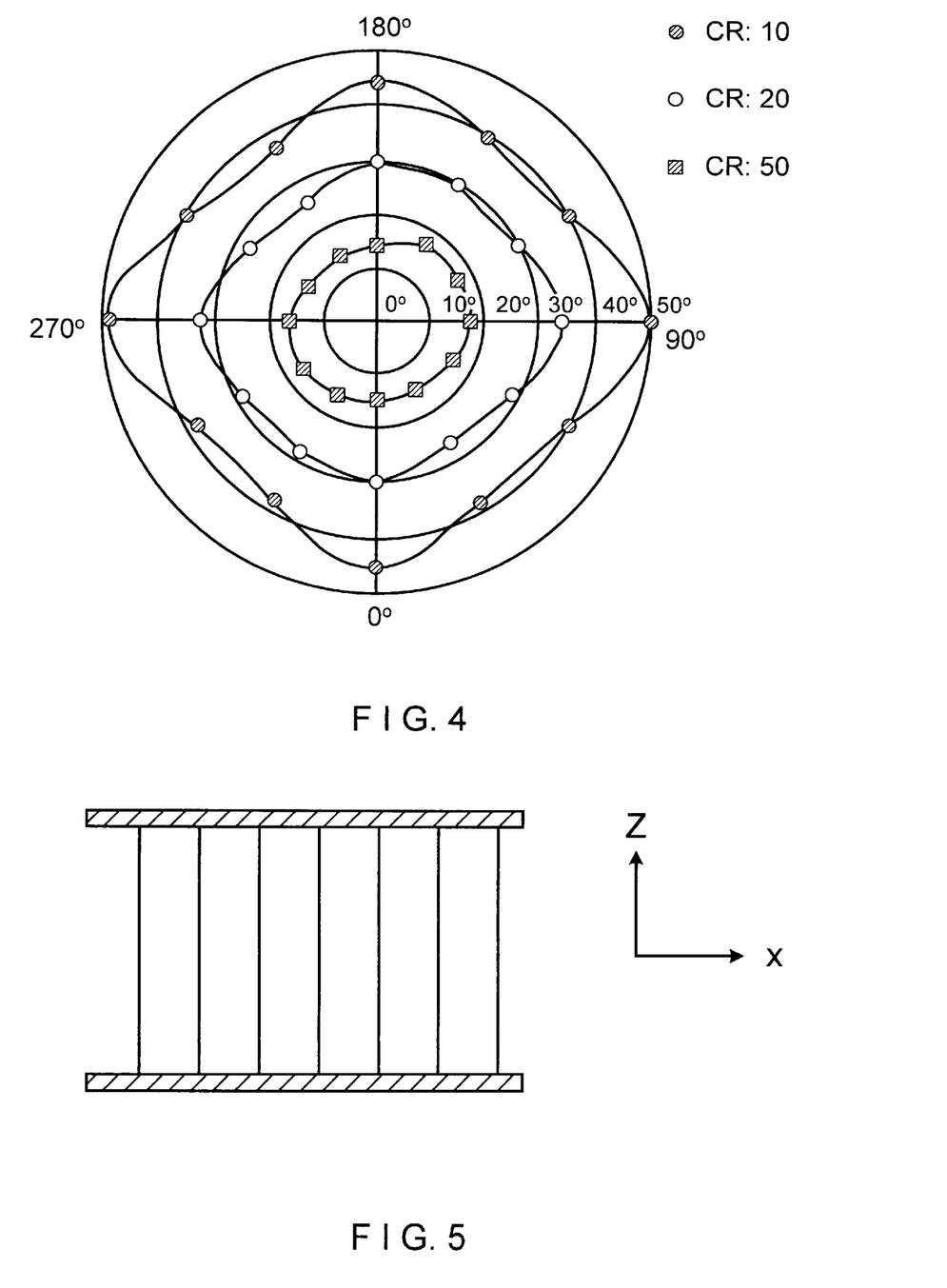
FIG. 4 shows a polar plot of the contrast ratio for a prior art system.
FIG. 5 is a schematic view showing nematic discotic material uniformly oriented with the director along the z direction.

The device of the present invention can be fabricated as per the details given below. Suitable substrates transparent in the visible region of spectrum are selected. On these substrates a coating of transparent electrically conducting material is applied. If necessary, an additional coating of a polymer may be applied to enhance the uniform adhesion of the nematic discotic material to the substrates. A spacer material to fix the spacing between the substrates is used on the non-electrically active areas of the substrates. The gap between the two substrates is filled with the required amount of nematic discotic material to form a cell. This is effected by heating the cell, during the process of filling, to a temperature above the nematic-isotropic point, and then cooling it till the material transforms to the nematic phase. The nematic discotic is then spontaneously aligned with the disc-like molecules adhering flat against the surfaces, or, equivalently, with the director normal to the surfaces (FIG. 5). Since the $N_D$ material is of negative dielectric anisotropy, the application of a sufficiently strong electric field, greater than a threshold value, results in the directors to be aligned parallel to the surfaces of the substrates but randomly oriented in the x-y plane (FIG. 6). The nematic discotic material acts as the electrically switchable material (FIG. 7). Thus, between crossed polarizers there is a transition from the dark to the bright state when the electric field is switched ON. Because of the anchoring of the molecules at the boundary layers, the material returns to the original configuration in the OFF state.

A liquid crystal display device was fabricated as explained above using hexakis ((4-nonylphenyl)ethynyl) benzene (of negative dielectric anisotropy $\Delta\epsilon=-0.18$). The cell gap measured interferometrically was 2.6 μm. A voltage of 10 $V_{rms}$ 1 kHz sinewave pulse of 5 seconds duration with a repetition rate of 0.1 $s^{-1}$ was applied. When the device is switched ON by applying the electric field, the time taken for the transmitted intensity to rise from 10% to 90% of the maximum intensity is ~100 ms and that from 10% to 80% of the maximum intensity is ~50 ms. A typical electro-optic response curve obtained employing the above said device is shown in FIG. 11 of the drawings.

Figure 12:
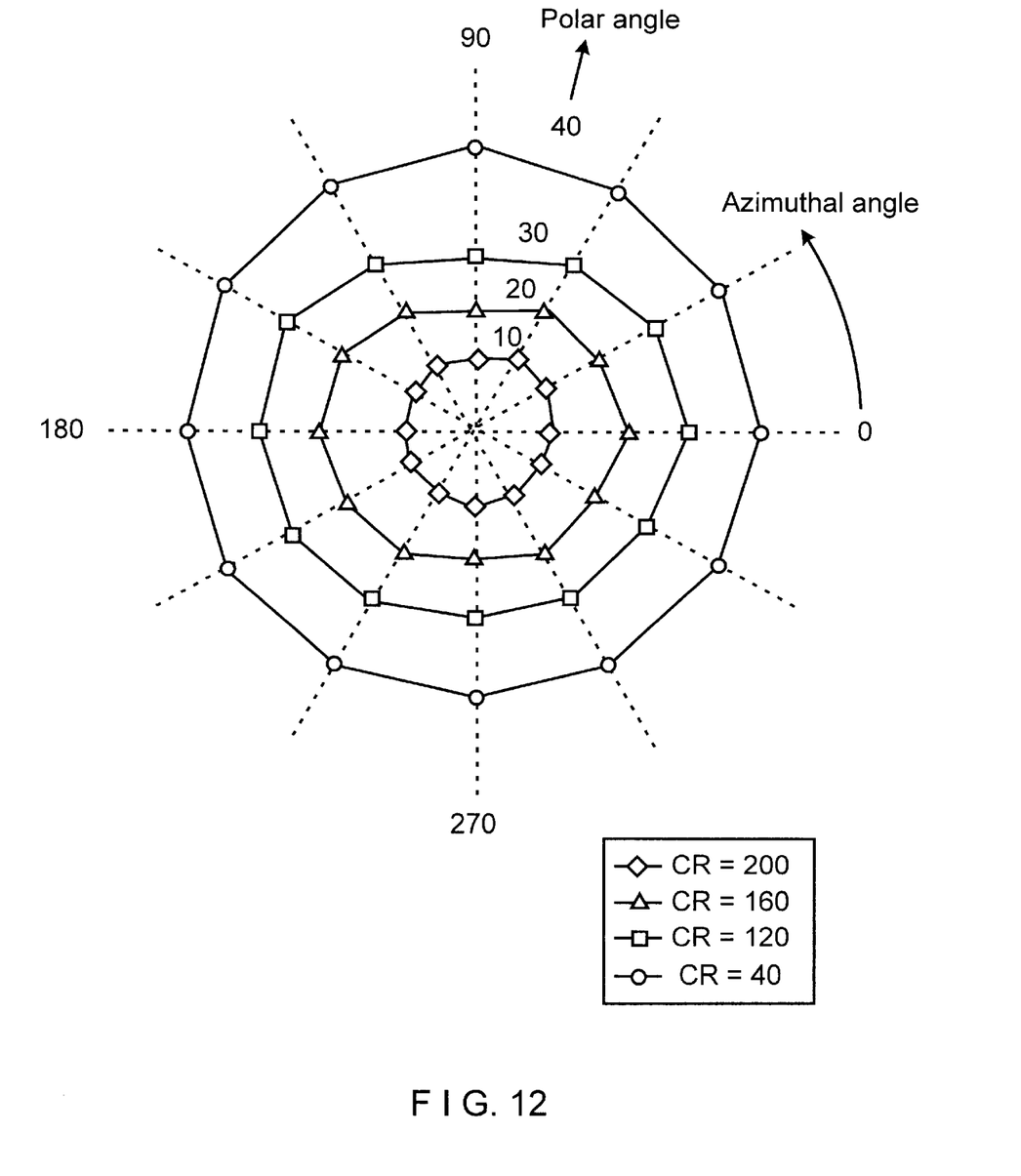
FIG. 12 shows a polar plot of the contrast ratio between the intensities in the ON to OFF states of the device of FIG. 11.

The polar plot of the contrast ratio between the intensities in the ON to OFF states is given in FIG. 12 of the drawings. This figure reflects that the device of the present invention shows very good contrast ratios, the contours of equal contrast ratios being nearly concentric circles and free from contrast inversion.

ADVANTAGES OF THE PRESENT INVENTION

1) The invention, for the first time, employs nematic discotic material as the electrically switchable material for the fabrication of a liquid crystal display device.
2) The device of the present invention overcomes the disadvantages of conventional TN and STN devices which employ nematic calamitic materials.
3) The viewing angle characteristic of the device of the present invention is wide and symmetric thereby improving the performance of the device.
4) The difference in the pixel capacitance between the ON and OFF states for the nematic discotic is less than that obtained for the conventional TN and STN devices which use calamitic liquid crystals, thus reducing cross talk problems in multiplexed displays.
5) The fabrication of the device of the present invention is simplified as the step involving rubbing of the polymer is avoided.
6) The requirement of coating of the substrates by a polymer can also be avoided by employing substrates having optically flat surfaces, thereby further simplifying the process of fabricating the device.
7) The use of polarizers can also be avoided by incorporating discotic pleochroic dyes in the nematic discotic material thereby making the device economical to fabricate.

What is claimed is:
1. A liquid crystal display device comprising
a) a pair of transparent substrates,
b) each substrate having on one of its surfaces a coating of a transparent electrically conducting material which serves as an electrode, and
c) a nematic discotic material sandwiched between the coated surfaces of the said substrates thereby forming a cell, the cell residing between a pair of crossed polarizers, said nematic discotic material having a negative dielectric anisotropy and molecules of the discotic material adhering flat against said coated surfaces, wherein when no electric field is applied thereto the discotic material is uniformly oriented with the director thereof being perpendicular to said surfaces, and when an electric field is applied in a z-direction perpendicular to the coated surfaces, the director in the discotic material is realigned parallel to the coated surfaces with random orientation in the x-y plane.

2. A device as claimed in claim 1, wherein the transparent substrate is made of glass or plastic.

3. A device as claimed in claim 1, wherein the transparent electrically conducting material is Indium Tin Oxide or Tin Oxide.

4. A device as claimed in claim 1, wherein the resulting substrates are coated with an additional layer of a polymer so as to make the contact of the material with the substrates uniform.

5. A device as claimed in claim 4, wherein the polymer is selected from the group consisting of polyimides, polyamides, and polyvinyl alcohol.

6. A device as claimed in claim 1, wherein the substrates are spaced apart by employing spacers chosen from the group consisting of polyethyleneterephthalate films, polyimide films and glass microspheres.

7. A device as claimed in claim 1, wherein the nematic discotic material is chosen from the group consisting of the formulas I, II, III, IV(a) and IV(b):

(I)

(II)

(III)

(IV)

R = (a) or (b)

(a):

(b):

8. A device as claimed in claim 1 wherein an optical reflector is provided at the bottom surface of the device for its use in a reflective mode.

9. A device as claimed in claim 1, wherein a discotic pleochroic dye chosen from the group consisting of derivatives of anthraquinone, phthalocyanine and porphyrin is incorporated in the nematic discotic material before filling it into the cell.

10. A liquid crystal display device comprising
    (a) a pair of transparent substrates,
    (b) each substrate having on one of its surfaces a coating of a transparent electrically conducting material which serves as an electrode, and
    (c) a nematic discotic material sandwiched between the coated surfaces of the said substrates thereby forming a cell, said nematic discotic material having a negative dielectric anisotropy and acting as the electrically switchable material for the electro-optic functioning of said liquid crystal display device, wherein the cell resides between a pair of crossed polarizers.

11. A device as claimed in claim 10, wherein the transparent substrate is made of glass or plastic.

12. A device as claimed in claim 10, wherein the transparent electrically conducting material is Indium Tin Oxide or Tin Oxide.

13. A device as claimed in claim 10, wherein the resulting substrates are coated with an additional layer of a polymer so as to make the contact of the material with the substrates uniform.

14. A device as claimed in claim 13, wherein the polymer is selected from the group consisting of polyimides, polyamides, and polyvinyl alcohol.

15. A device as claimed in claim 10, wherein the substrates are spaced apart by employing spacers chosen from the group consisting of polyethyleneterephthalate films, polyimide films and glass microspheres.

16. A device as claimed in claim 10, wherein the nematic discotic material is chosen from the group consisting of the formulas I, II, III, IV(a) and IV(b):

(I)

(II)

-continued (III)

(IV)

17. A device as claimed in claim 10, wherein an optical reflector is provided at the bottom surface of the device for its use in a reflective mode.

18. A device as claimed in claim 10, wherein a discotic pleochroic dye chosen from the group consisting of derivatives of anthraquinone, phthalocyanine and porphyrin is incorporated in the nematic discotic material before filling it into the cell.

* * * * *